US012534319B2

(12) United States Patent
Tanaka et al.

(10) Patent No.: US 12,534,319 B2
(45) Date of Patent: Jan. 27, 2026

(54) FEEDING DEVICE AND IMAGE FORMING APPARATUS

(71) Applicant: FUJIFILM Business Innovation Corp., Tokyo (JP)

(72) Inventors: Kei Tanaka, Kanagawa (JP); Masato Matsuzuki, Kanagawa (JP); Kiyotaka Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 196 days.

(21) Appl. No.: 18/190,118

(22) Filed: Mar. 26, 2023

(65) Prior Publication Data

US 2024/0034577 A1 Feb. 1, 2024

(30) Foreign Application Priority Data

Jul. 29, 2022 (JP) ................................ 2022-122226

(51) Int. Cl.
*B65H 3/48* (2006.01)
*B41J 13/08* (2006.01)
(Continued)

(52) U.S. Cl.
CPC ................ *B65H 3/08* (2013.01); *B41J 13/08* (2013.01); *G03G 15/6529* (2013.01); *B65H 2301/423* (2013.01); *B65H 2406/14* (2013.01)

(58) Field of Classification Search
CPC . B65H 5/22; B65H 5/08; B65H 5/228; B65H 3/48; B65H 3/0816;
(Continued)

(56) References Cited

U.S. PATENT DOCUMENTS 4,887,805 A * 12/1989 Herbert .................. B65H 3/128
271/34
5,090,676 A * 2/1992 Matsuno .................. B65H 3/12
271/94
(Continued)

FOREIGN PATENT DOCUMENTS

JP 3220553 10/2001
JP 2013216487 10/2013

OTHER PUBLICATIONS

"Search Report of Europe Counterpart Application", issued on Jan. 8, 2024, pp. 1-7.

*Primary Examiner* — Leslie A Nicholson, III
(74) *Attorney, Agent, or Firm* — JCIPRNET

(57) ABSTRACT

A feeding device includes a supply unit that supplies air between plural stacked media and that floats the media, a feeding unit that makes the media floated by the supply unit stick thereto and that feeds the media, a separating unit that supplies the air obliquely downward to a front surface side of a second medium positioned immediately below a first medium stuck to the feeding unit from a downstream side to an upstream side in a medium feeding direction and that separates the second medium from the first medium, and a blasting unit that blasts the air obliquely downward to the front surface side of the second medium from the downstream side to the upstream side in the medium feeding direction and that has a blasting angle of the air with respect to the medium feeding direction larger than a supply angle of the air of the separating unit.

18 Claims, 12 Drawing Sheets

(51) Int. Cl.
*B65H 3/08* (2006.01)
*G03G 15/00* (2006.01)

(58) Field of Classification Search
CPC ........ B65H 2301/423; B65H 2406/122; B65H 2406/14; B65H 2406/12; B65H 2406/30; B65H 2406/31; B65H 2406/35; B65H 2406/351; B65H 2801/06
USPC .......................................................... 271/211
See application file for complete search history.

(56) References Cited

U.S. PATENT DOCUMENTS

| | | | | | |
|---|---|---|---|---|---|
| 5,092,578 | A * | 3/1992 | Bergmeier | B65H 3/48 | 271/106 |
| 6,082,728 | A * | 7/2000 | Ubayashi | B65H 3/128 | 271/106 |
| 6,629,692 | B2 * | 10/2003 | Allner | B65H 3/48 | 271/106 |
| 6,669,187 | B1 * | 12/2003 | Clark | B65H 3/48 | 271/106 |
| 7,490,826 | B2 * | 2/2009 | Takai | B65H 11/005 | 271/97 |
| 7,549,629 | B2 * | 6/2009 | Tateishi | B65H 3/128 | 271/103 |
| 8,141,864 | B2 * | 3/2012 | Fukumoto | B65H 3/56 | 271/97 |
| 8,424,866 | B2 * | 4/2013 | Ikeda | B65H 3/48 | 271/97 |
| 8,684,346 | B2 | 4/2014 | Yamazaki et al. | | |
| 9,926,151 | B2 | 3/2018 | Takahashi et al. | | |
| 11,339,017 | B2 | 5/2022 | Niwa | | |
| 2021/0171300 | A1 * | 6/2021 | Niwa | B65H 3/0833 | |

* cited by examiner

FEEDING DEVICE AND IMAGE FORMING APPARATUS

CROSS-REFERENCE TO RELATED APPLICATIONS

This application is based on and claims priority under 35 USC 119 from Japanese Patent Application No. 2022-122226 filed Jul. 29, 2022.

BACKGROUND

(i) Technical Field

The present disclosure relates to a feeding device and an image forming apparatus.

(ii) Related Art

JP2013-216487A discloses a paper feeding device that has at least a paper placing table which includes a positioning guide in all directions, a sticking mechanism which includes a sticking head, and an air supply mechanism, that makes a first layer paper stick to the sticking head of the sticking mechanism one by one in turn among a plurality of sheets of stacked paper in a state of being positioned on the paper placing table at a predetermined position by the positioning guide while the air supply mechanism sends air between a second layer paper thereunder and the first layer paper, and that sucks the first layer paper to be let out to a downstream process. In the paper feeding device, the sticking mechanism includes a blasting device that blasts an air flow downward to hit or to sweep over a forward portion thereof from edges on a front side and/or a lateral side thereof to the edges of the front side and/or the lateral side during an operation of the sticking mechanism in a case of letting out the first layer paper on the stacked paper and that keeps a blasting condition of the air flow constant on the line of flow of the sticking mechanism.

SUMMARY

Aspects of non-limiting embodiments of the present disclosure relate to a feeding device and an image forming apparatus that supply air, in a configuration where a floating medium is stuck and fed, to a front surface side of a second medium positioned immediately below a stuck first medium in a horizontal direction from a downstream side to an upstream side in a medium feeding direction and to prevent double-feeding of media compared to a configuration where the second medium is separated from the first medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a feeding device including a supply unit that supplies air between a plurality of stacked media and that floats the media, a feeding unit that makes the media floated by the supply unit stick thereto and that feeds the media, a separating unit that supplies the air obliquely downward to a front surface side of a second medium positioned immediately below a first medium stuck to the feeding unit from a downstream side to an upstream side in a medium feeding direction and that separates the second medium from the first medium, and a blasting unit that blasts the air obliquely downward to the front surface side of the second medium from the downstream side to the upstream side in the medium feeding direction and that has a blasting angle of the air with respect to the medium feeding direction larger than a supply angle of the air of the separating unit.

BRIEF DESCRIPTION OF THE DRAWINGS

Exemplary embodiment(s) of the present invention will be described in detail based on the following figures, wherein.

DETAILED DESCRIPTION

Hereinafter, an example of an exemplary embodiment according to the present disclosure will be described based on the drawings.

Image Forming Apparatus 10

Figure 1:
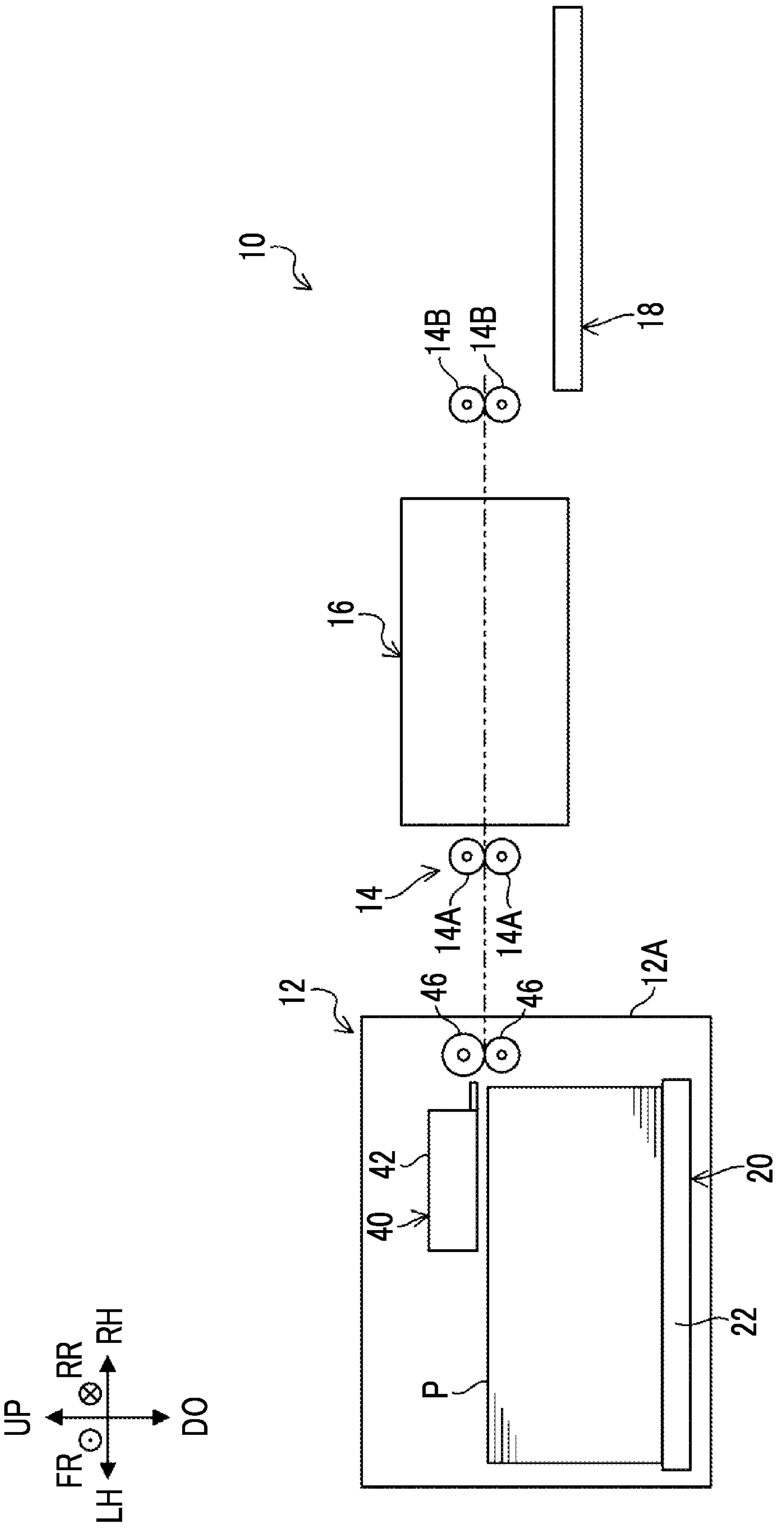
FIG. 1 is a schematic view showing an image forming apparatus according to the present exemplary embodiment.

First, a configuration of an image forming apparatus 10 according to the present exemplary embodiment will be described. FIG. 1 is a schematic view showing the configuration of the image forming apparatus 10 according to the present exemplary embodiment.

An arrow UP shown in the drawings indicates an upward direction of the apparatus (specifically, a vertically upward direction), and an arrow DO indicates a downward direction of the apparatus (specifically, a vertically downward direction). In addition, an arrow LH shown in the drawings indicates a leftward direction of the apparatus, and an arrow RH indicates a rightward direction of the apparatus. In addition, an arrow FR shown in the drawings indicates a forward direction of the apparatus, and an arrow RR indicates a rearward direction of the apparatus. Since the directions are directions determined for convenience of description, an apparatus configuration is not limited to the directions. The term "apparatus" in each direction of the apparatus is omitted in some cases. That is, for example, the "upward direction of the apparatus" is simply referred to as the "upward direction" in some cases.

In addition, in the following description, an "up-down direction" is used to mean "both of the upward direction and the downward direction" or "any one of the upward direction or the downward direction" in some cases. A "right-left direction" is used to mean "both of the rightward direction and the leftward direction" or "any one of the rightward direction or the leftward direction" in some cases. The "right-left direction" can also be referred to as sideways, a lateral direction, and a horizontal direction. A "front-rear direction" is used to mean "both of the forward direction and the rearward direction" or "any one of the forward direction or the rearward direction" in some cases. The "front-rear direction" can also be referred to as sideways, a lateral direction, and a horizontal direction. In addition, the up-down direction, the right-left direction, and the front-rear direction are directions intersecting each other (specifically, directions orthogonal to each other).

In addition, a symbol in which "x" is written in "○" in the drawings means an arrow from the front toward the back of the page. In addition, a symbol in which "•" is written in "○" in the drawings means an arrow from the back toward the front of the page.

The image forming apparatus 10 shown in FIG. 1 is an apparatus that forms an image on a recording medium P which is an example of a medium. Specifically, as shown in FIG. 1, the image forming apparatus 10 includes a feeding device 12, a transporting unit 14, an image forming unit 16, and a discharging unit 18. Hereinafter, each unit of the image forming apparatus 10 will be described.

Transporting Unit 14

The transporting unit 14 shown in FIG. 1 is a configuration unit that transports the recording medium Pin the image forming apparatus 10. The transporting unit 14 has a function of transporting the recording medium P fed from the feeding device 12 to the image forming unit 16 and a function of transporting the recording medium P on which an image is formed by the image forming unit 16 to the discharging unit 18.

Specifically, the transporting unit 14 has transporting members 14A and 14B configured by a pair of transport rollers. In the transporting unit 14, the transporting member 14A transports the recording medium P fed from the feeding device 12 to the image forming unit 16, and the transporting member 14B transports the recording medium P on which the image is formed by the image forming unit 16 to the discharging unit 18.

The transporting members 14A and 14B are not limited to the pair of transport rollers. The transporting members 14A and 14B may be, for example, transporting members such as a transport belt and a transport drum, and it is possible to use various transporting members.

Image Forming Unit 16

The image forming unit 16 shown in FIG. 1 is a configuration unit that forms an image on the recording medium P fed from the feeding device 12. Examples of the image forming unit 16 include an inkjet image forming unit that forms an image on the recording medium using inks and an electrophotographic image forming unit that forms an image on the recording medium using toners.

In the inkjet image forming unit, for example, ink droplets are jetted to the recording medium from a jetting unit, and an image is formed on the recording medium. The inkjet image forming unit may form an image on the recording medium as the jetting unit jets ink droplets to a transfer body and the ink droplets are transferred from the transfer body to the recording medium.

The electrophotographic image forming unit performs, for example, each of processes, such as charging, exposing, developing, and transferring, and forms an image on the recording medium. As each of the processes, such as charging, exposing, developing, and transferring, is performed to form an image on the transfer body and the image is transferred from the transfer body to the recording medium, the electrophotographic image forming unit may form the image on the recording medium.

Examples of the image forming unit are not limited to the inkjet image forming unit described above and the electrophotographic image forming unit described above, and various image forming units can be used.

Discharging Unit 18

The discharging unit 18 shown in FIG. 1 is a portion to which the recording medium on which an image is formed is discharged in the image forming apparatus 10. After the image is formed by the image forming unit 16, the recording medium P transported by the transporting unit 14 (specifically, the transporting member 14B) is discharged to the discharging unit 18.

Feeding Device 12

Figure 2:
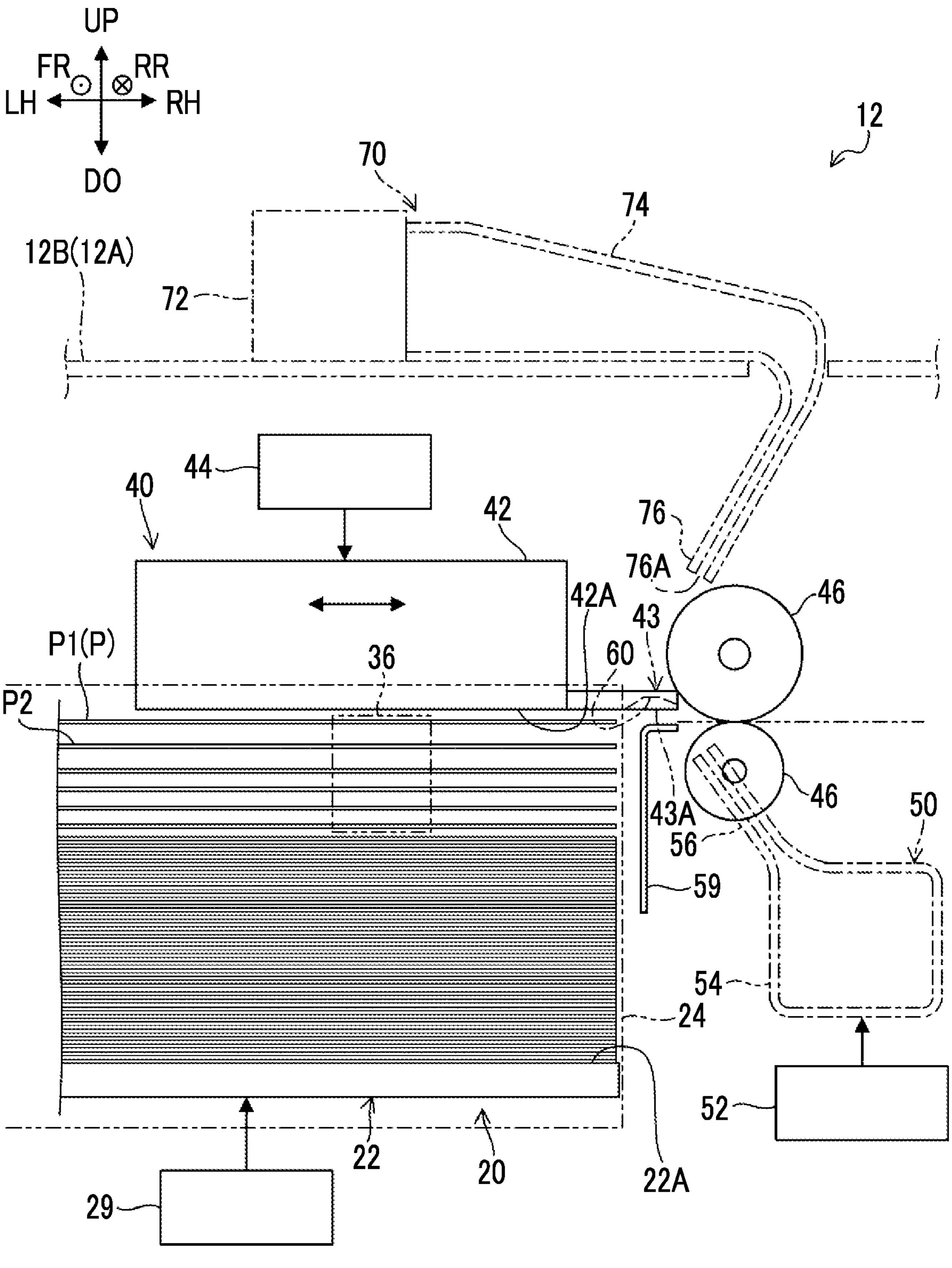
FIG. 2 is a schematic view showing an accommodating unit and a feeding section of a feeding device according to the present exemplary embodiment.
Figure 8:
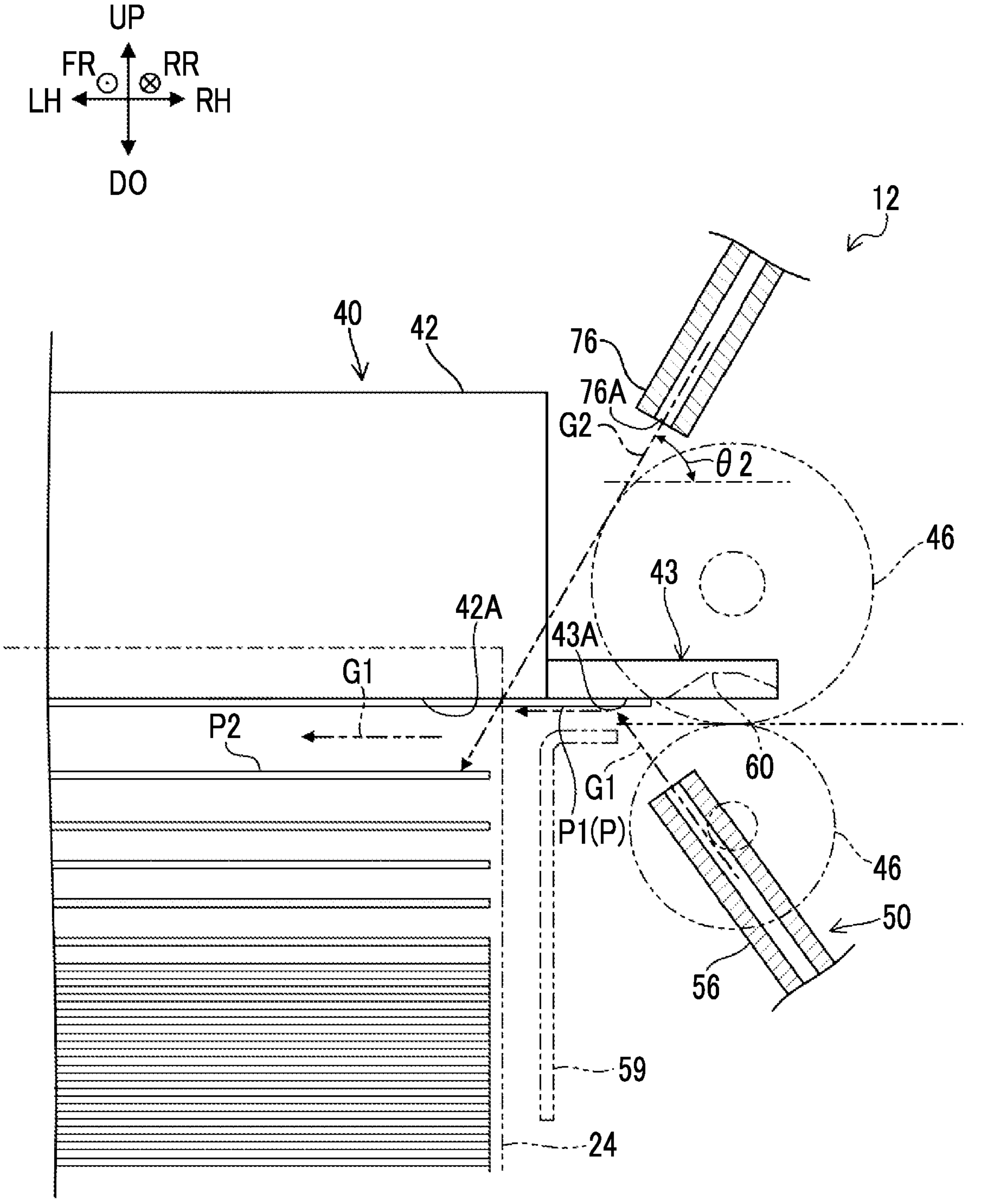
FIG. 8 is a schematic view showing a state where the feeding unit of the feeding device shown in FIG. 5 is moved to a delivery position.

The feeding device 12 shown in FIGS. 1, 2, and 8 is a device that feeds the recording medium P. In the present exemplary embodiment, the feeding device 12 feeds the recording medium P in a feeding direction (specifically, the rightward direction) determined in advance. Therefore, in the feeding device 12, the rightward direction is a downstream side in the feeding direction, and the leftward direction is an upstream side in the feeding direction. In addition, in the recording medium P fed from the feeding device 12, a downstream end portion in the feeding direction will be referred to as a leading end portion, and an upstream end portion in the feeding direction will be referred to as a trailing end portion. In addition, in the recording medium P, a direction (specifically, the front-rear direction) intersecting the feeding direction will be referred to as a width direction, and an end portion in the width direction will be referred to as a side end portion.

Figure 3:
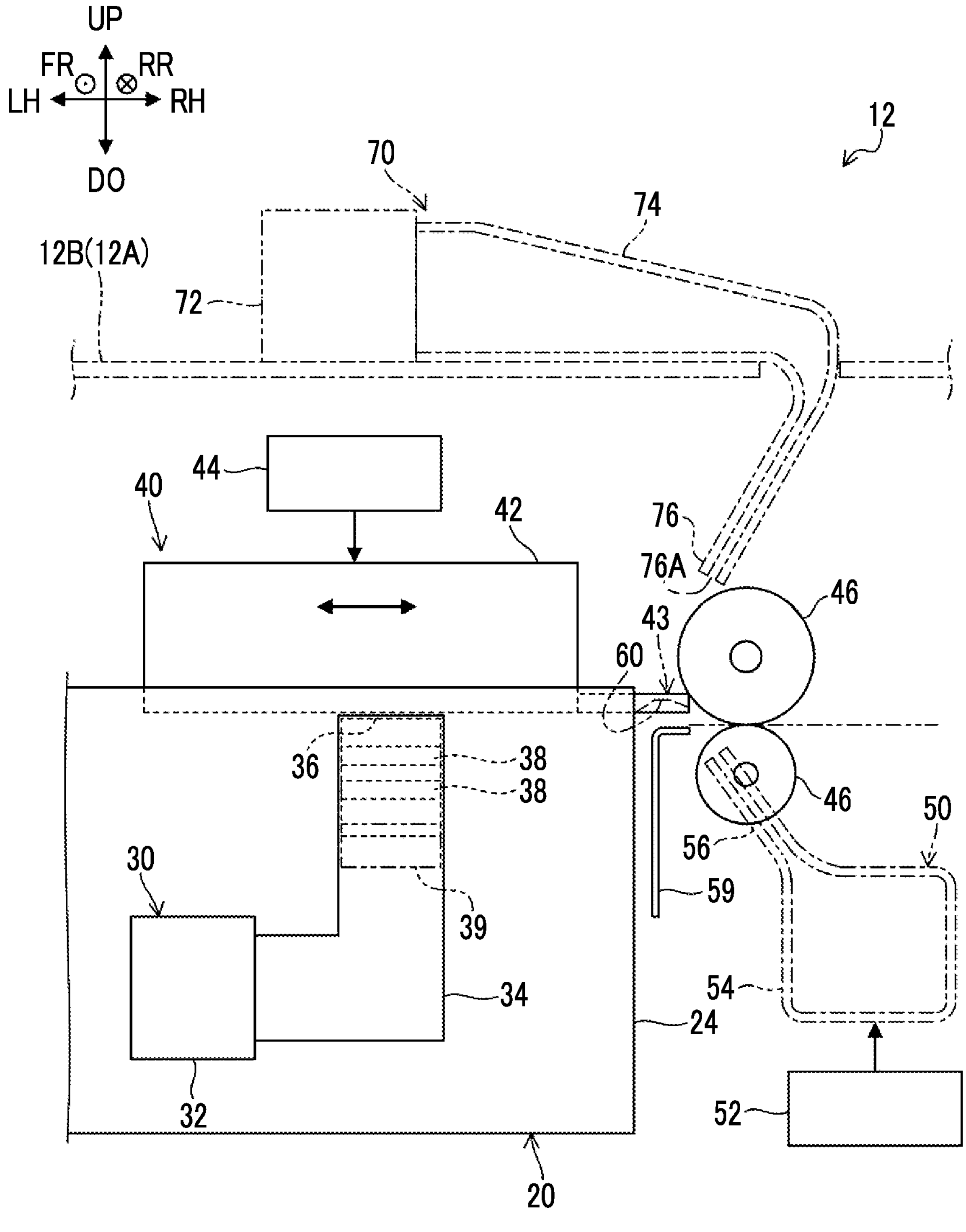
FIG. 3 is a view of the feeding device according to the present exemplary embodiment, which is viewed from an outer surface side of a side wall.

Specifically, as shown in FIGS. 2 and 3, the feeding device 12 includes an accommodating unit 20, a lifting and lowering unit 29 (see FIG. 2), a supply unit 30 (see FIG. 3), a feeding unit 40, a separating unit 50, a restricting unit 59, and a blasting unit 70. Hereinafter, each unit of the feeding device 12 will be described.

Accommodating Unit 20 and Lifting and Lowering Unit 29

The accommodating unit 20 is a configuration unit that accommodates the recording medium P. Specifically, as shown in FIG. 2, the accommodating unit 20 has a stacking portion 22 and a pair of side walls 24. FIG. 2 shows one side wall 24 (specifically, a forward side) of the pair of side walls 24.

The stacking portion 22 is a configuration unit on which the recording media P are stacked. Specifically, the stacking portion 22 configures a bottom portion of the accommodating unit 20 and is configured by a stacking plate (so-called bottom plate) having an upper surface 22A on which the recording media P are stacked.

Each of the pair of side walls 24 is disposed on each of the forward side and a rearward side with respect to the recording media P stacked on the stacking portion 22. Each of the pair of side walls 24 faces each of a pair of side end portions of the recording media P stacked on the stacking portion 22, and the recording media P are positioned in the width direction (that is, the front-rear direction).

The accommodating unit 20 has a positioning unit (not shown) that positions the trailing end portions of the recording media P stacked on the stacking portion 22. The accommodating unit 20 is not limited to the configuration, and various configurations can be used.

The lifting and lowering unit 29 is a configuration unit that lifts and lowers the recording medium P accommodated in the accommodating unit 20. Specifically, the lifting and lowering unit 29 lifts the recording medium P such that the uppermost recording medium P is positioned at a height determined in advance (hereinafter, referred to as a feeding height) by lifting the stacking portion 22 and lowers the recording medium P by lowering the stacking portion 22.

For example, a pulling member, such as a wire, a pushing member, such as an arm, and the like can be used as the lifting and lowering unit 29. For example, the recording medium P is lifted as the stacking portion 22 is pulled upward by the pulling member, and the recording medium P is lowered by the weights of the recording medium P and the stacking portion 22. For example, the recording medium P is lifted as the stacking portion 22 is pushed upward from a lower side of the stacking portion 22 by the pushing member, and the recording medium P is lowered by the weights of the recording medium P and the stacking portion 22. The lifting and lowering unit 29 is not limited to the configuration, and various configurations can be used.

Supply Unit 30

Figure 4:
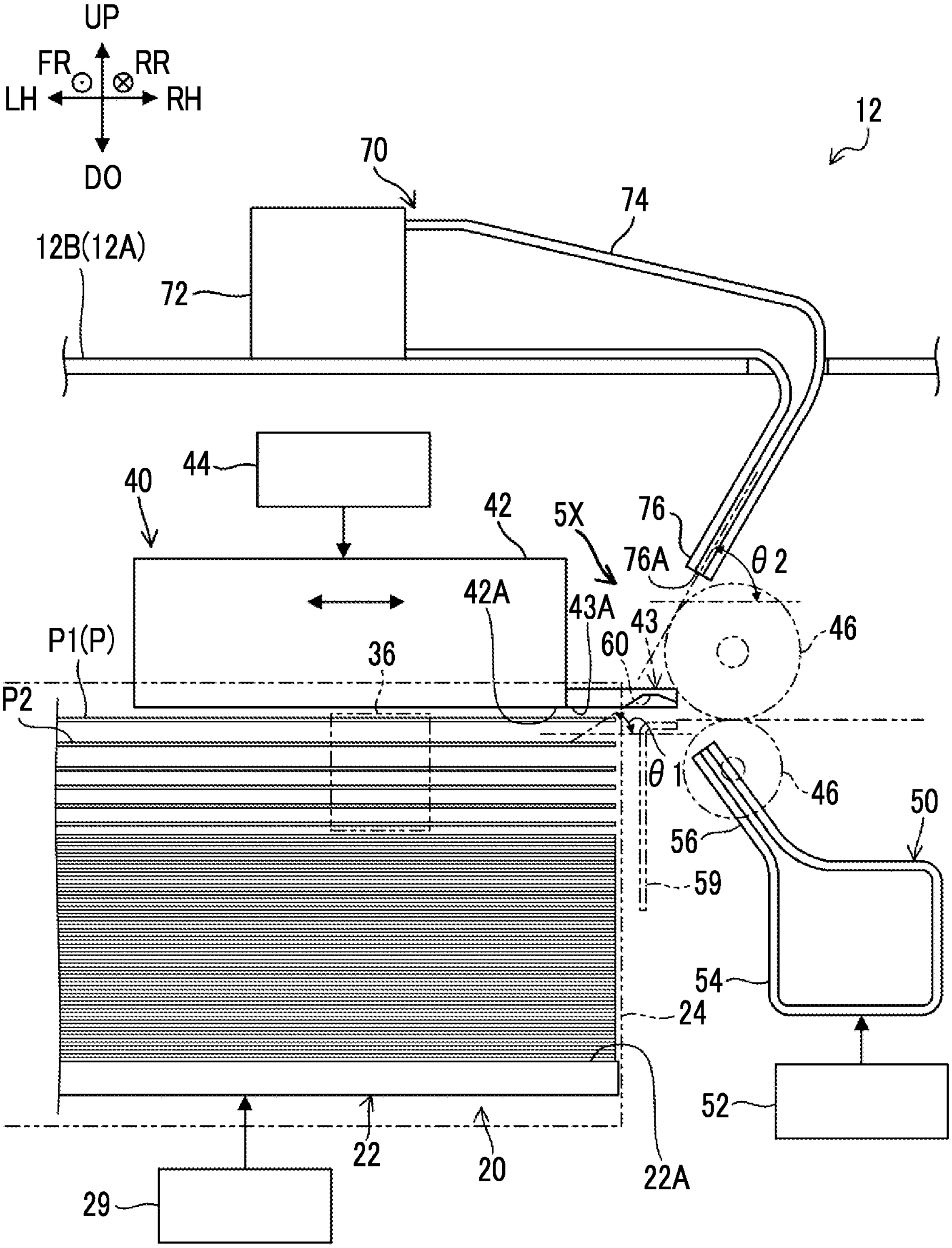
FIG. 4 is a schematic view showing a supply unit and a blasting unit of the feeding device according to the present exemplary embodiment.
Figure 5:
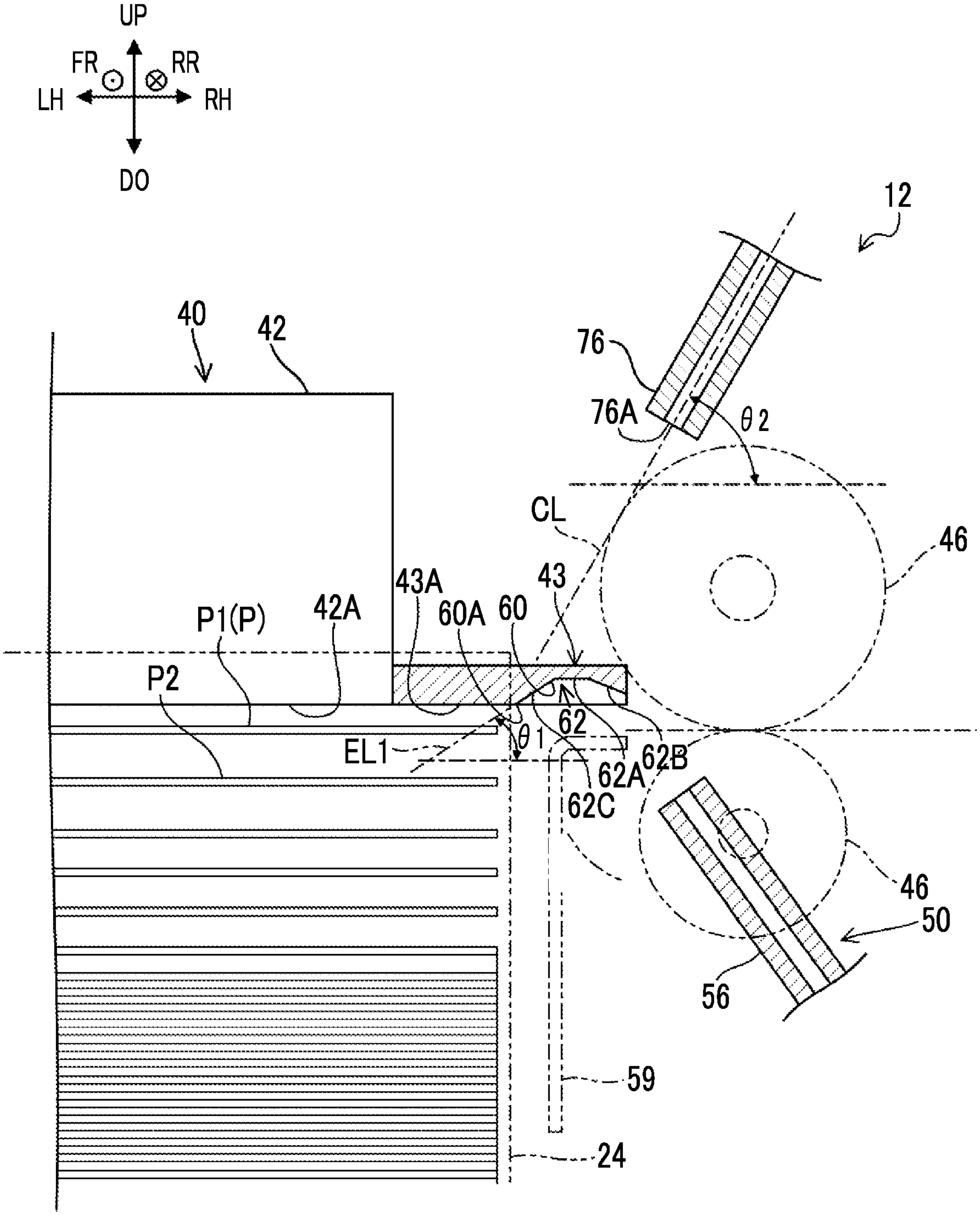
FIG. 5 is an enlarged view of a portion indicated by 5X of FIG. 4.

The supply unit 30 shown in FIG. 3 is a configuration unit that supplies air between a plurality of stacked recording media P and that floats the recording media P. The supply unit 30 supplies air to the plurality of recording media P positioned in a range determined in advance, including the uppermost recording medium P, among the plurality of recording media P stacked on the stacking portion 22. That is, the supply unit 30 supplies air to the plurality of recording media P stacked on the stacking portion 22 in a range from the feeding height to a position thereunder determined in advance. Herein, floating the recording media P as the supply unit 30 supplies air between the plurality of stacked recording media P is to separate the plurality of recording media P from each other one by one and to feed one by one by supplying air between the plurality of recording media P respectively. FIGS. 2, 4, and 5 schematically show a state where air is supplied to an upper portion of the plurality of stacked recording media P for floating.

In the present exemplary embodiment, as shown in FIG. 3, the supply unit 30 has a pair of blowing units 32, a pair of flow pipes 34, and a pair of supply ports 36.

The pair of blowing units 32 are configuration units that send wind (that is, air). Each of the pair of blowing units 32 is attached to an outer surface (that is, a surface on an opposite side to a surface facing the recording media P stacked on the stacking portion 22) of each of the pair of side walls 24. For example, centrifugal blowers that blow air in a centrifugal direction, such as multi-blade blowers (for example, sirocco fans), are used as the blowing units 32. Axial flow blowers that blow air in an axial direction and other blowers may be used as the blowing units 32.

Each of the pair of flow pipes 34 configures a passage through which air sent from each of the pair of blowing units 32 passes. One end portion of each of the pair of flow pipes 34 is connected to each of the pair of blowing units 32, and the other end portion is connected to each of the pair of supply ports 36.

Each of the pair of supply ports 36 is an opening part that supplies air to the plurality of recording media P stacked on the stacking portion 22 and is formed in each of the pair of side walls 24. Each of the pair of supply ports 36 is on a leading end portion side of the recording media P stacked on the stacking portion 22 and is open to an upper portion of the side wall 24.

In the supply unit 30, the pair of blowing units 32 supply air between the plurality of recording media P stacked on the stacking portion 22 from both of side end portion sides (that is, the forward side and the rearward side) through the pair of flow pipes 34 and the pair of supply ports 36.

A supply direction changing unit 38 is a configuration unit that changes an air supply direction between the plurality of stacked recording media P. Specifically, the supply direction changing unit 38 is configured by, for example, a louver that is provided at the supply port 36 and that has a plurality of blade plates. The supply direction changing unit 38 can change the air supply direction to, for example, at least one of the up-down direction or the right-left direction. The supply direction changing unit 38 is not limited to the louver, and other changing means may be used.

A supply region changing unit 39 is a configuration unit that changes an air supply region between the plurality of stacked recording media P. Specifically, the supply region changing unit 39 is configured by, for example, an opening and closing plate (that is, a shutter) that is provided to be movable to the supply port 36 and that can change at least one of an opening position or an opening area of the supply port 36 through movement. The supply region changing unit 39 can change the air supply region in, for example, at least one of the up-down direction or the right-left direction. The supply region changing unit 39 is not limited to the opening and closing plate, and other changing means may be used.

The supply unit 30 supplies air between the plurality of recording media P stacked on the stacking portion 22 from both of the side end portion sides (that is, the forward side and the rearward side), but is not limited thereto. The supply unit 30 may be configured to supply air between the plurality of stacked recording media P from one side (that is, one of the forward side or the rearward side) of both side end portions. In addition, the supply unit 30 may be configured to supply air from at least one side of the leading end portion or the trailing end portion of the recording medium P, instead of or in addition to supplying air from at least one side of both side end portion sides of the recording medium P between the plurality of stacked recording media P. Therefore, the supply unit 30 can be configured to supply air between the plurality of recording media P stacked on the stacking portion 22 from at least one side of the leading end portion or the trailing end portion of both side end portions.

Feeding Unit 40

Figure 6:
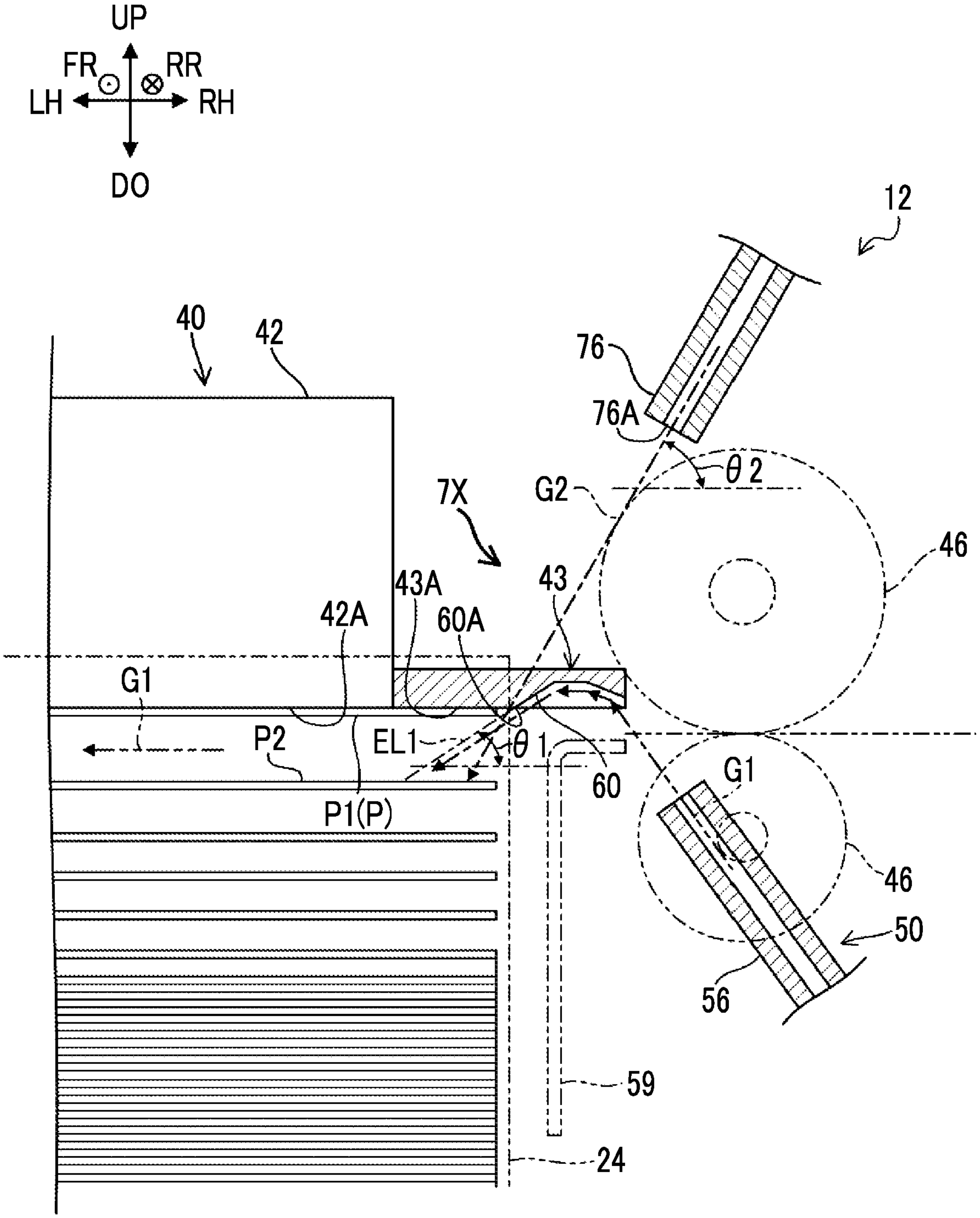
FIG. 6 is a schematic view showing a state where an uppermost recording medium is stuck to a feeding unit of the feeding device shown in FIG. 5.

The feeding unit 40 shown in FIGS. 2, 5, and 6 is a configuration unit that makes the recording medium P floated by the supply unit 30 stick thereto and that feeds the recording medium P. Specifically, as shown in FIG. 6, the feeding unit 40 makes the uppermost recording medium P (hereinafter, referred to as an uppermost medium P1), among the recording media P floated by the supply unit 30, stick thereto and feeds the uppermost recording medium P1 to the downstream side in the feeding direction (specifically, the rightward direction) as shown in FIG. 8. More specifically, as shown in FIGS. 3 and 4, the feeding unit 40 has a sticking body 42 and a moving mechanism 44.

The sticking body 42 is a configuration body that makes the uppermost medium P1 stick to a lower surface 42A through suction. Specifically, on a trailing end portion side of a leading end portion of the uppermost medium P1 positioned at the feeding height, the sticking body 42 makes the uppermost medium P1 stick thereto. An overhanging portion 43 that overhangs to the downstream side in the feeding direction (specifically, the rightward direction) is formed at the sticking body 42. As the uppermost medium P1 sticks to the lower surface 42A of the sticking body 42, the leading end portion of the uppermost medium P1 is pushed against a lower surface 43A of the overhanging portion 43. The lower surface 42A of the sticking body 42 is an example of a sticking surface.

The moving mechanism 44 is a mechanism that moves the sticking body 42 in the feeding direction with respect to a device body 12A of the feeding device 12. Specifically, the moving mechanism 44 is a mechanism that moves the sticking body 42 in the right-left direction (that is, a downstream direction and an upstream direction of the feeding direction), between a suction position (a position shown in FIGS. 2 and 6) and a delivery position (a position shown in FIG. 8).

Specifically, the moving mechanism 44 is configured, for example, by using a known mechanism such as a motor, a gear, a rack, a pinion, and a belt drive. The moving mechanism 44 is not limited to a certain mechanism, and various configurations can be used.

In the feeding unit 40, the sticking body 42 makes the uppermost medium P1 stick to the lower surface 42A through suction at the suction position (the position shown in FIGS. 2 and 6), and the sticking body 42 is moved to the delivery position (the position shown in FIG. 8) by the moving mechanism 44. Then, at the delivery position, the recording medium P is delivered from the sticking body 42 to a pair of feeding rollers 46, and the pair of feeding rollers 46 feed the recording medium P toward the image forming unit 16.

The pair of feeding rollers 46 are feeding members (an example of a feeding section) that feed the recording medium P toward the image forming unit 16. The pair of feeding rollers 46 are disposed on the downstream side in the feeding direction with respect to the sticking body 42 (specifically, the delivery position described above) to come into contact with each other in the up-down direction. The feeding members are not limited to the pair of feeding rollers 46. The feeding members may be, for example, feeding members such as annular belts and drums, and it is possible to use various feeding members.

The feeding unit 40 is not limited to the configuration. For example, the feeding unit 40 may be configured to use a feeding member such as a belt, instead of the sticking body 42. In the configuration where the annular belt is used, for example, a suction unit that makes the recording medium P stick to an outer peripheral surface of the belt through suction can be configured to be provided at an inner periphery of the belt. In a case of such an annular belt, the stuck recording medium P can be fed to the pair of feeding rollers 46 through circumferential motion of the belt. That is, in a case of the annular belt, the recording medium P can be fed to the pair of feeding rollers 46 even in a state where the belt is fixed to the device body 12A in the right-left direction.

Separating Unit 50

Figure 7:
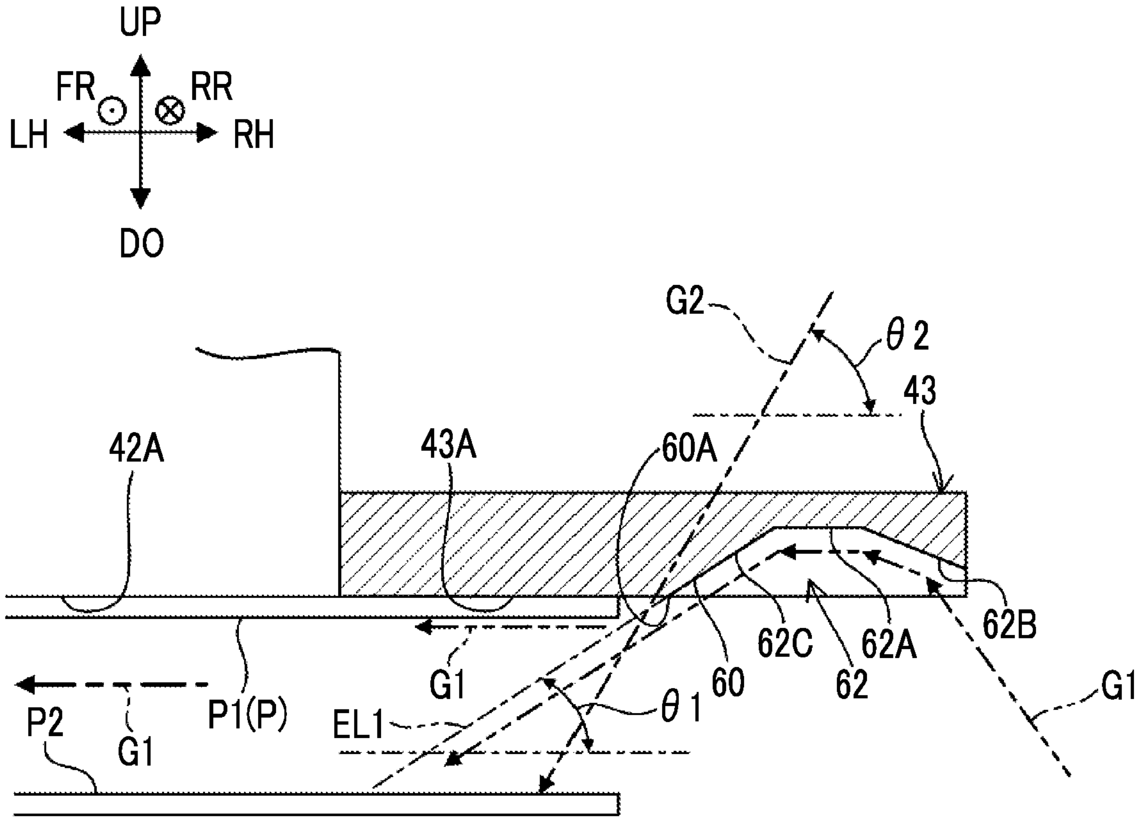
FIG. 7 is an enlarged view of a portion indicated by 7X of FIG. 6.

The separating unit 50 shown in FIGS. 4 and 5 is a configuration unit that supplies air G1 to the recording medium P (hereinafter, referred to as the next medium P2) positioned immediately below the uppermost medium P1 stuck to the feeding unit 40 (specifically, the sticking body 42) and that separates the next medium P2 from the uppermost medium P1. The uppermost medium P1 is an example of a first medium. In addition, the next medium P2 is an example of a second medium. The next medium P2 is the recording medium P that is fed next to the uppermost medium P1 and is the recording medium P disposed adjacently below the uppermost medium P1. Specifically, the separating unit 50 supplies the air G1 obliquely downward (the obliquely lower left in FIGS. 6 and 7) from the downstream side to the upstream side in the feeding direction to a front surface side of the next medium P2 positioned immediately below the uppermost medium P1 stuck to the feeding unit 40 as shown in FIGS. 6 and 7 and separates the next medium P2 from the uppermost medium P1. More specifically, the separating unit 50 has, for example, a supply device 52, a flow pipe 54, a nozzle 56, and a guide surface 60 as shown in FIG. 4.

The supply device 52 is a device that supplies the air G1 to the flow pipe 54. The supply device 52 is disposed below the blasting unit 70. The supply device 52 is an example of an air supply unit. For example, an air compressor that supplies compressed air to the flow pipe 54 or the like is used as the supply device 52. The supply device 52 is not limited to the air compressor, and other supply devices may be used.

The flow pipe 54 configures a passage through which the air G1 sent from the supply device 52 passes. The flow pipe 54 extends along the width direction (that is, the front-rear direction) of the recording medium P and flows the air G1 along the width direction.

A plurality of nozzles 56 are provided along the width direction (that is, the front-rear direction) of the recording medium P with respect to the flow pipe 54. Each of the plurality of nozzles 56 extends from the flow pipe 54 to a sticking body 42 (specifically, the overhanging portion 43) side (that is, an obliquely upper left side). The nozzles 56 have a function of leading the air G1 supplied from the supply device 52 through the flow pipe 54 to an upper side (obliquely upper left side). The nozzle 56 is an example of an air supply path.

The guide surface 60 is disposed on the upper side (obliquely upper left side) of the nozzle 56. The guide surface 60 is an example of a guide unit that guides the air G1 supplied (jetted) from the nozzle 56 obliquely downward from the downstream side to the upstream side in the feeding direction. The guide surface 60 is, specifically, a surface that the air G1 supplied from the nozzle 56 hits and is provided at a lower surface of the overhanging portion 43. More specifically, as shown in FIG. 7, the guide surface 60 is configured by a recessed portion 62 provided in the lower surface 43A of the overhanging portion 43. The guide surface 60 has a bottom surface 62A of the recessed portion 62, an inclined wall surface 62B on the downstream side in the feeding direction from the bottom surface 62A, and an inclined wall surface 62C on the upstream side in the feeding direction from the bottom surface 62A. An interval between the inclined wall surface 62B and the inclined wall surface 62C becomes larger toward the lower surface of the overhanging portion 43. Specifically, as shown in FIG. 7, the inclined wall surface 62B extends obliquely downward to the right from the bottom surface 62A. In addition, the inclined wall surface 62C extends obliquely downward to the left from the bottom surface 62A. Although the inclined wall surface 62B extends linearly from the bottom surface 62A as shown in FIG. 7 in the present exemplary embodiment, the present disclosure is not limited thereto. The inclined wall surface 62B may extend from the bottom surface 62A while bending in an arc shape. In addition, although the inclined wall surface 62C extends linearly from the bottom surface 62A as shown in FIG. 7 in the present exemplary embodiment, the present disclosure is not limited thereto. In addition, the inclined wall surface 62C may extend from the bottom surface 62A while bending in an arc shape.

Herein, in a case where the air G1 hits the guide surface 60 obliquely upward to the left, the hit air G1 flows along the guide surface 60. Specifically, as shown in FIG. 7, the air G1, which has hit the inclined wall surface 62B, flows from the inclined wall surface 62B along the inclined wall surface 62C through the bottom surface 62A. That is, the air G1 jetted from the nozzle 56 is guided obliquely downward (specifically, obliquely downward to the left) from the downstream side to the upstream side in the feeding direction by the guide surface 60.

In the separating unit 50, in a state where the sticking body 42 is positioned at the suction position (the position shown in FIGS. 2 and 6), the air G1 is jetted obliquely upward from the nozzle 56 toward the guide surface 60 from the downstream side to the upstream side in the feeding direction. The jetted air G1 hits the guide surface 60. Then, the air G1 that has hit the guide surface 60 is guided by the guide surface 60 and is supplied obliquely downward to the front surface side of the next medium P2 from the downstream side to the upstream side in the feeding direction. Specifically, the supplied air G1 passes between the uppermost medium P1 and the next medium P2 from the downstream side to the upstream side in the feeding direction. Accordingly, the next medium P2 is separated from the uppermost medium P1.

After passing a tip (an end on the upstream side in the feeding direction) of the guide surface 60, the air G1 guided by the guide surface 60 flows along an extension line EL1 of the guide surface 60 and is supplied to the front surface side of the next medium P2. Herein, the extension line EL1 is inclined at an angle θ1 with respect to the feeding direction. That is, the air G1 jetted from the nozzle 56 is supplied to the front surface side of the next medium P2 at an angle inclined by the angle θ1 with respect to the feeding direction as being guided by the guide surface 60.

Restricting Unit 59

The restricting unit 59 shown in FIG. 4 is a configuration unit that restricts the movement of the next medium P2 to the downstream side in the feeding direction. Specifically, the restricting unit 59 is configured by a restricting wall disposed between the accommodating unit 20 and the pair of feeding rollers 46 (specifically, the feeding roller 46 disposed on the lower side) in side view. The restricting unit 59 is formed in a plate shape extending in the up-down direction in side view.

The restricting unit 59 lowers the next medium P2 from the uppermost medium P1 by coming into contact with the next medium P2 fed to the downstream side in the feeding direction together with the uppermost medium P1 in response to the movement of the sticking body 42 to the delivery position and restricts the movement of the next medium P2 to the downstream side in the feeding direction. The restricting unit 59 is not limited to the configuration, and other restricting means may be used.

Blasting Unit 70

The blasting unit 70 shown in FIGS. 4 and 5 is a configuration unit that blasts air G2 obliquely downward to the front surface side of the next medium P2 from the downstream side to the upstream side in the feeding direction. A blasting angle θ2 of the air G2 of the blasting unit 70 with respect to the feeding direction is larger than a supply angle θ1 of the air G1 of the separating unit 50. For this reason, the blasting unit 70 has a function of pressing the next medium P2 downward. The blasting angle θ2 will be described later.

More specifically, the blasting unit 70 has, for example, a supply device 72, a flow pipe 74, and a nozzle 76, as shown in FIG. 4.

The supply device 72 is a device that supplies the air G2 to the flow pipe 74. The supply device 72 is disposed above the feeding unit 40 as shown in FIG. 4. For example, an air compressor that supplies compressed air to the flow pipe 74 or the like is used as the supply device 72. The supply device 72 is not limited to the air compressor, and other supply devices may be used.

The flow pipe 74 configures a passage through which the air G2 sent from the supply device 72 passes. The flow pipe 74 extends along the width direction (that is, the front-rear direction) of the recording medium P and flows the air G2 along the width direction.

A plurality of nozzles 76 are provided along the width direction (that is, the front-rear direction) of the recording medium P with respect to the flow pipe 74. Each of the plurality of nozzles 76 extends from the flow pipe 74 to an overhanging portion 43 side (that is, an obliquely lower left side). The nozzles 76 have a function of leading the air G2 supplied from the supply device 72 through the flow pipe 74 to the lower side (obliquely lower left side). As shown in FIG. 6, in the nozzle 76, a center line CL of an internal flow path is inclined at the angle θ2 with respect to the feeding direction. The air G2 is jetted from the nozzle 76 in a direction along the center line CL. Herein, the blasting angle θ2 is larger than the supply angle θ1 as described above. For example, the blasting angle θ2 is preferably set within a range that is larger than the supply angle θ1 and smaller than 90 degrees with respect to the feeding direction. Herein, in a case where the blasting angle θ2 is 90 degrees, the next medium P2 is easily pressed downward by the air G2 jetted from the nozzle 76, but it is difficult to avoid the uppermost medium P1 stuck to the sticking body 42 and to blast the air G2 to the next medium P2. On the other hand, in a case of being the supply angle θ1 or smaller, the air G2 jetted from the nozzle 76 flows on the front surface of the next medium P2, and thereby an effect of pressing the next medium P2 downward is small.

In addition, as shown in FIGS. 3 and 4, the blasting unit 70 is fixed to the device body 12A. Specifically, the supply device 72 of the blasting unit 70 is fixed to a support unit 12B provided in the device body 12A. The support unit 12B is disposed above the feeding unit 40.

Figure 9:
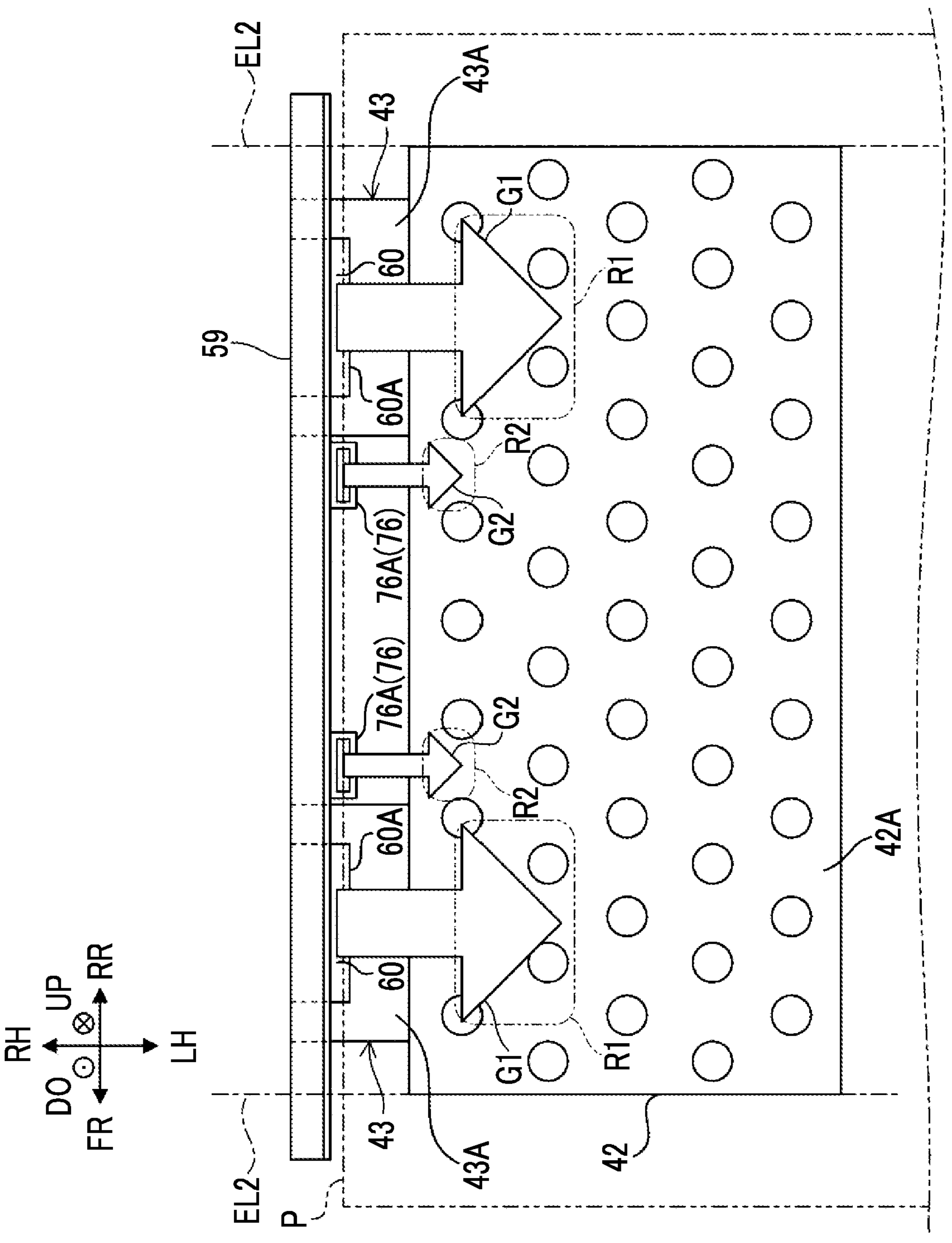
FIG. 9 is a view of the feeding device according to the present exemplary embodiment, which is viewed from a bottom surface side of the accommodating unit.

In addition, FIG. 9 is a view (plan view) of the feeding device 12 viewed from below. As viewed in FIG. 9, an air supply port 60A of the separating unit 50 and an air blasting port 76A of the blasting unit 70 are positioned on the downstream side of the lower surface 42A of the sticking body 42 in the feeding direction and on the inner side of the recording medium P in the width direction. Herein, the air supply port 60A refers to the tip of the guide surface 60 (a tip of the inclined wall surface 62C), and the air blasting port 76A refers to a tip opening of the nozzle 76. In addition, positioning the air supply port 60A and the air blasting port 76A on downstream side of the lower surface 42A in the feeding direction and on the inner side of the recording medium P in the width direction refers to having (positioning) the air supply port 60A and the air blasting port 76A between extension lines EL2 (one-dot chain lines in FIG. 9) extending from both ends of the lower surface 42A in the width direction of the recording medium P to the downstream side in the feeding direction along the feeding direction. In addition, as shown in FIG. 9, in the present exemplary embodiment, the overhanging portion 43 is positioned on the downstream side of the lower surface 42A in the feeding direction and on the inner side of the recording medium P in the width direction. For this reason, the entire guide surface 60 is positioned on the downstream side of the lower surface 42A in the feeding direction and on the inner side of the recording medium P in the width direction.

In addition, as viewed in FIG. 9, the air supply port 60A and the air blasting port 76A are shifted away from each other in the direction orthogonal to the feeding direction (herein, the same direction as the width direction of the recording medium P). Specifically, the air supply ports 60A are disposed at an interval in the width direction of the recording medium P, and a pair of air blasting ports 76A are disposed between the air supply ports 60A adjacent to each other in the width direction of the recording medium P. More specifically, the pair of air blasting ports 76A are disposed between the pair of guide surfaces 60 adjacent to each other.

In addition, in the present exemplary embodiment, the separating unit 50 and the blasting unit 70 are separate bodies. A pressure applied to the next medium P2 through air blasting of the blasting unit 70 is higher than a pressure applied to the next medium P2 through air supply of the separating unit 50. Herein, a pressure difference of air to the next medium P2 may be generated by making a generation amount of compressed air caused by the supply device 72 of the blasting unit 70 larger than a generation amount of compressed air caused by the supply device 52 of the separating unit 50, but a pressure difference of air may be generated without changing the generation amount of compressed air by making an air blasting region R2 (a region indicated by a one-dot chain line of FIG. 9) with respect to the next medium P2 caused by the blasting unit 70 narrower than an air supply region R1 (a region indicated by a two-dot chain line of FIG. 9) with respect to the next medium P2 caused by the separating unit 50. For example, jetting pressures in a case of jetting air from the nozzles of the blasting unit 70 and the separating unit 50 respectively may be set to be the same. Even in this case, the air G1 that passes through the guide surface 60 hits the next medium P2 within a wider range than the air G2 jetted from the nozzle 76. A pressure applied to the next medium P2 in the air supply region R1 becomes smaller than a pressure applied to the next medium P2 in the air blasting region R2 since the air supply region R1 is wider than the air blasting region R2.

Each part (the supply unit 30, the feeding unit 40, the separating unit 50, the blasting unit 70, or the like) configuring the feeding device 12 is controlled by a control unit (not shown).

Figure 10:
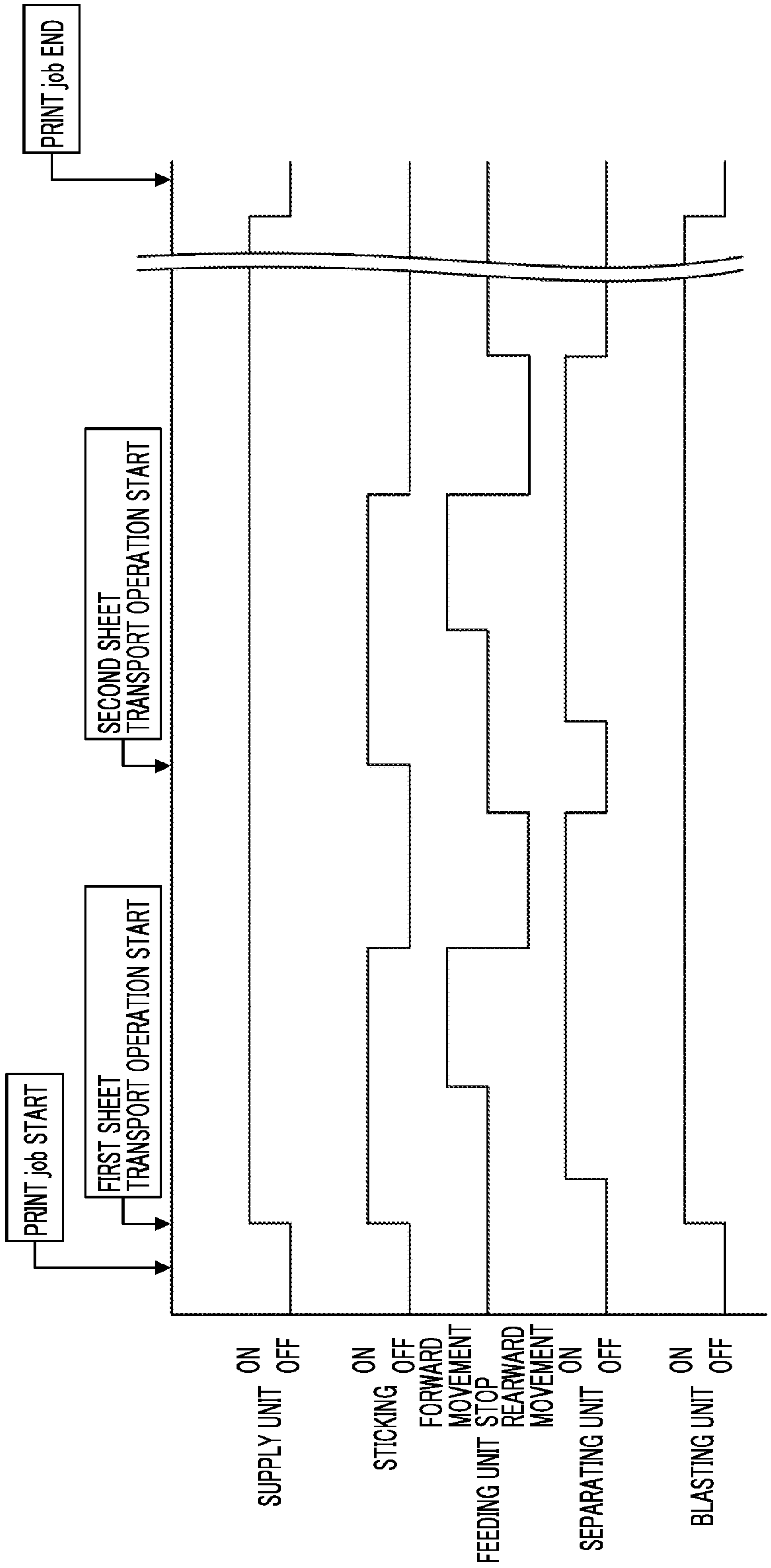
FIG. 10 is a timing chart showing an operation of each configuration part of the feeding device according to the present exemplary embodiment.

As shown in FIG. 10, the blasting unit 70 is controlled such that the air G2 is blasted for a period from supply start of the air G2 from at least the separating unit 50 to the next medium P2 to feeding start of the uppermost medium P1 by the feeding rollers 46 of the feeding unit 40. Specifically, the blasting unit 70 is controlled such that the air G2 is continuously blasted until a feeding job of the plurality of recording media P ends. In a case where the air G2 is continuously blasted until the feeding job of the plurality of recording media P ends as described above, control is performed such that an air blasting force to the recording medium P caused by the blasting unit 70 is smaller than a sticking force of the recording medium P caused by the feeding unit 40.

Workings According to Present Exemplary Embodiment

Next, workings according to the present exemplary embodiment will be described.

In the feeding device 12, air is supplied between the plurality of stacked recording media P from the supply unit 30, and the recording media P are floated. Next, the feeding unit 40 makes the uppermost medium P1 floated by the supply unit 30 stick thereto. Then, the separating unit 50 supplies the air G1 obliquely downward from the downstream side to the upstream side in the feeding direction to the front surface side of the next medium P2 positioned immediately below the uppermost medium P1 stuck to the feeding unit 40 and separates the next medium P2 from the uppermost medium P1. Specifically, the air G1 supplied from the nozzle 56 to the front surface side of the next medium P2 passes between the next medium P2 and the uppermost medium P1 and separates the next medium P2 from the uppermost medium P1. Further, in the feeding device 12, the air G2 is blasted obliquely downward to the front surface side of the next medium P2 from the blasting unit 70 from the downstream side to the upstream side in the feeding direction. Herein, the blasting angle θ2 of the air G2 of the blasting unit 70 is larger than the supply angle θ1 of the air G1 of the separating unit 50. For this reason, the next medium P2 can be pressed downward. Accordingly, compared to a configuration where the next medium P2 is separated from the uppermost medium P1 with only air supplied from the separating unit 50, the next medium P2 can be pulled apart from the uppermost medium P1. That is, an effect of separating the next medium P2 from the uppermost medium P1 increases.

In particular, since a pressure applied to the next medium P2 through air blasting of the blasting unit 70 is higher than a pressure applied to the next medium P2 through air supply of the separating unit 50 in the present exemplary embodiment, the next medium P2 is pushed downward by the air G2 blasted from the blasting unit 70. As a result, an effect of pulling the next medium P2 apart from the uppermost medium P1 (that is, a separating effect) increases.

In addition, in the feeding device 12 of the present exemplary embodiment, as described above, the air G1 is supplied obliquely downward from the downstream side to the upstream side in the feeding direction to the front surface side of the next medium P2 positioned immediately below the uppermost medium P1 stuck to the feeding unit 40. For this reason, in the feeding device 12, air is supplied in the horizontal direction (an opposite direction to the feeding direction) from the downstream side to the upstream side in the feeding direction to the front surface side of the next medium P2 positioned immediately below the stuck uppermost medium P1, and double-feeding of the recording media P may be prevented compared to a configuration where the next medium P2 is separated from the uppermost medium P1. Specifically, the next medium P2 is easily pulled apart from the uppermost medium P1 by making the air G1 from the separating unit 50 hit the front surface side of the next medium P2 obliquely downward from the downstream side to the upstream side in the feeding direction. The air G2 from the blasting unit 70 easily hits the front surface side of the next medium P2 by widening a gap between the uppermost medium P1 and the next medium P2. As a result, double-feeding of the recording media P may be prevented.

In addition, in the feeding device 12 of the present exemplary embodiment, the air supply region R1 caused by the separating unit 50 is narrower than the air blasting region R2 caused by the blasting unit 70. For this reason, compared to a configuration where the air blasting region R2 caused by the blasting unit 70 is larger than the air supply region R1 caused by the separating unit 50, a generation amount of the blasted air (compressed air) G2 caused by the supply device 72 of the blasting unit 70 may be reduced.

In the feeding device 12 of the present exemplary embodiment, the blasting unit 70 is fixed to the device body 12A while the feeding unit 40 is movable in the feeding direction with respect to the device body 12A. For this reason, the blasting unit 70 can blast the air G2 from a fixed position toward the next medium P2. Accordingly, in the feeding device 12, a failure of delivery to the feeding rollers 46, which is caused as a leading end of the uppermost medium P1 (a downstream end in the feeding direction) hangs downward due to the blasting of the air G2, may be prevented compared to a configuration where the blasting unit 70 moves together with the feeding unit 40.

In the feeding device 12 of the present exemplary embodiment, since the air supply port 60A and the air blasting port 76A are positioned on the downstream side of the lower surface 42A in the feeding direction and on the inner side of the recording medium P in the width direction in plan view, a distance between the air supply port 60A and the air blasting port 76A, and the next medium P2 becomes closer compared to a configuration of being positioned on the downstream side of the lower surface 42A in the feeding direction and on an outer side of the recording medium P in the width direction. Accordingly, an effect of pulling the next medium P2 apart from the uppermost medium P1 increases. As a result, a failure of delivery to the feeding rollers 46, which is caused as the leading end of the uppermost medium P1 (the downstream end in the feeding direction) hangs downward due to the blasting of the air G2, may be prevented.

In addition, in the feeding device 12 of the present exemplary embodiment, the air supply port 60A of the separating unit 50 and the air blasting port 76A of the blasting unit 70 are shifted away from each other in the direction orthogonal to the medium feeding direction in plan view. For this reason, in the feeding device 12, compared to a configuration where the air supply port 60A and the air blasting port 76A are at the same position in the width direction of the recording medium P in plan view, interference between the air G1 from the air supply port 60A and the air G2 from the air blasting port 76A can be prevented even in a case where air supply from the air supply port 60A and air blasting from the air blasting port 76A are simultaneously performed. That is, in the feeding device 12, since air interference can be prevented as described above, air supply from the air supply port 60A and air blasting from the air blasting port 76A may be simultaneously performed.

In addition, in the feeding device 12 of the present exemplary embodiment, the air supply ports 60A are disposed at an interval in the width direction of the recording medium P in plan view, and the air blasting ports 76A are disposed between the air supply ports 60A adjacent to each other in the width direction. For this reason, in the feeding device 12, compared to a configuration where the air blasting ports 76A are disposed on the outer sides of the air supply ports 60A adjacent to each other in the width direction of the recording medium P in plan view, the air G2 from the air blasting port 76A is easily blasted to the front surface side of the next medium P2 (in other words, the air G2 is easily blown to the next medium P2) while widening the gap between the uppermost medium P1 and the next medium P2 through air supply from the air supply ports 60A on both sides.

In addition, in the feeding device 12 of the present exemplary embodiment, the supply device 52 of the separating unit 50 is disposed below the blasting unit 70. In addition, the air G1 supplied from the supply device 52 is led upward via the flow pipe 54 and the nozzle 56. Then, the led air G1 approaches obliquely downward through the guide surface 60 from the downstream side to the upstream side in the feeding direction and is supplied to the front surface side of the next medium P2. Herein, in the feeding device 12, a degree of freedom of layout improves compared to a configuration where the supply device 52 of the separating unit 50 is disposed on the same side (herein, upper side) as the blasting unit 70 since the separating unit 50 and the blasting unit 70 are assigned up and down.

In addition, in the feeding device 12 of the present exemplary embodiment, the feeding unit 40 is provided with the overhanging portion 43 that overhangs toward the downstream side in the feeding direction. In addition, the lower surface 42A of the sticking body 42 and the lower surface 43A of the overhanging portion 43 that configure the feeding unit 40 are connected to each other in the feeding direction. In addition, the guide surface 60 is provided at the lower surface 43A of the overhanging portion 43. Herein, although the air G1 jetted from the nozzle 56 is supplied to the next medium P2 through the guide surface 60, some air G1 flows from the tip of the inclined wall surface 62C (air supply port 60A) along the lower surface 43A of the overhanging portion 43. In a case where the uppermost medium P1 is stuck to the lower surface 42A, which is the sticking surface, as the lower surface 42A and the lower surface 43A are connected to each other in the feeding direction, that is, there is no step between the lower surface 42A and the lower surface 43A, some air G1 (see FIG. 7) flows from the lower surface 43A to the upstream side in the feeding direction through a back surface of the uppermost medium P1. Accordingly, in a state where the uppermost medium P1 is stuck (a state where the uppermost medium P1 is unlikely to be peeled from the sticking surface), the next medium P2 is easily peeled from the uppermost medium P1 since the air G1 can be supplied between the uppermost medium P1 and the next medium P2. That is, the next medium P2 is easily separated from the uppermost medium P1.

In addition, in the feeding device 12 of the present exemplary embodiment, air blasting by the blasting unit 70 is performed for a period from air supply start to the next medium P2 by at least the separating unit 50 to feeding start of the uppermost medium P1 by the feeding rollers 46 of the feeding unit 40. Herein, in the feeding device 12, the double-feeding of the recording media P may be prevented compared to a configuration where the blasting unit 70 is stopped for a period from air supply start to the next medium P2 by the separating unit 50 to feeding start of the uppermost medium P1 by the feeding unit 40.

In addition, in the feeding device 12 of the present exemplary embodiment, air blasting by the blasting unit 70 is continuously performed until the feeding job of the plurality of recording media P ends. For this reason, in the feeding device 12, air blasting by the blasting unit 70, that is, control (for example, on-off control) of the blasting unit 70 is simplified compared to a configuration where blasting and stopping are repeated during the feeding job of the plurality of recording media P.

In addition, in the feeding device 12 of the present exemplary embodiment, the air blasting force of the blasting unit 70 is smaller than the sticking force of the feeding unit 40. Accordingly, in the feeding device 12, compared to a configuration where the air blasting force of the blasting unit 70 is greater than the sticking force of the feeding unit 40, the failure of delivery to the feeding rollers 46 may be prevented since hanging of the leading end (downstream end) of the uppermost medium P1 in the feeding direction is prevented.

An image is formed on the recording medium P fed from the feeding device 12 by the image forming apparatus 10 of the present exemplary embodiment. Herein, in the image forming apparatus 10, the air G1 is supplied in the horizontal direction from the downstream side to the upstream side in the feeding direction to the front surface side of the next medium P2 positioned immediately below the stuck uppermost medium P1, and a recording media jam caused by the double-feeding of the recording media P can be prevented compared to a configuration where a feeding device that separates the next medium P2 from the uppermost medium P1 and that performs feeding is used.

MODIFICATION EXAMPLE

Figure 11:
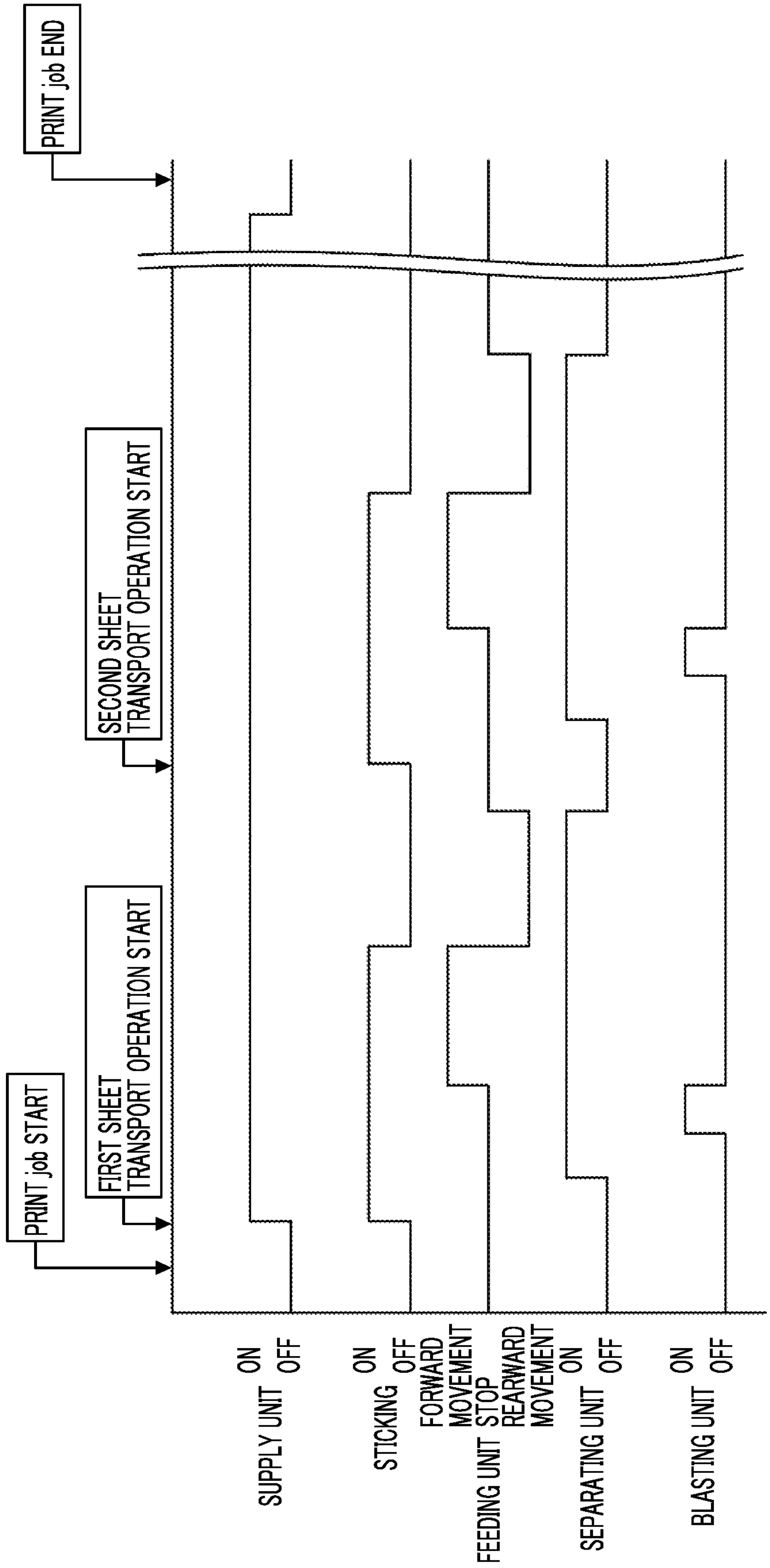
FIG. 11 is a timing chart showing an operation of each configuration part of a feeding device according to a modification example.

Although air blasting by the blasting unit 70 is continuously performed until the feeding job of the plurality of recording media P ends in the feeding device 12 of the present exemplary embodiment described above, the present disclosure is not limited thereto. For example, as shown in FIG. 11, air blasting by the blasting unit 70 may be performed (started) after the air G1 is started to be supplied from the separating unit 50 to the next medium P2. In this case, compared to a configuration where air blasting from the blasting unit 70 is performed before air supply from the separating unit 50, air blasting by the blasting unit 70 can be performed on the next medium P2 after an interval between the uppermost medium P1 and the next medium P2 is widened by the separating unit 50. Accordingly, the next medium P2 is easily peeled from the uppermost medium P1. In addition, air blasting by the blasting unit 70 may be performed after the air G1 is started to be supplied from the separating unit 50 to the next medium P2, and after then, may be stopped before feeding start of the uppermost medium P1 by the feeding unit 40. In this case, compared to a configuration where air blasting from the blasting unit 70 is stopped after the feeding start of the uppermost medium P1, an increase in power consumption caused by operation of the blasting unit 70 is prevented.

Although the air supply port 60A of the separating unit 50 and the air blasting port 76A of the blasting unit 70 are positioned to be shifted away from each other in the width direction of the recording medium P in plan view in the feeding device 12 of the exemplary embodiment described above, the present disclosure is not limited thereto. For example, the air supply port 60A of the separating unit 50 and the air blasting port 76A of the blasting unit 70 may be at the same position in the direction orthogonal to the feeding direction (that is, the width direction of the recording medium P) in plan view. In a case where the air supply port 60A and the air blasting port 76A are at the same position in the width direction of the recording medium P in plan view as described above, the size of the device in the front-rear direction can be made small compared to a configuration where the air supply port 60A and the air blasting port 76A are shifted away from each other in the width direction of the recording medium P. That is, the size of the feeding device 12 can be reduced. In addition, in a case where the air supply port 60A and the air blasting port 76A are at the same position in the width direction of the recording medium Pin plan view, by alternately performing air blasting by the blasting unit 70 and air supply by the separating unit 50, interference between the air G2 blasted by the blasting unit 70 and the air G1 supplied by the separating unit 50 can be prevented, for example, compared to a configuration where air blasting by the blasting unit 70 and air supply by the separating unit 50 are simultaneously performed.

Although the separating unit 50 has the guide surface 60 at the lower surface 43A of the overhanging portion 43 in the feeding device 12 of the exemplary embodiment described above, the present disclosure is not limited thereto. The separating unit 50 may not have the guide surface 60 at the lower surface 43A of the overhanging portion 43. For example, a tip side of the nozzle 56 is folded in the middle, and a tip opening of the nozzle 56 may face a direction along the extension line EL1 of the guide surface 60. Also in this case, the same effect as the configuration having the guide surface 60 is obtained. The tip opening of the nozzle 56 herein is an example of the air blasting port of the exemplary embodiment of the present disclosure. In addition, a member that has the guide surface 60 separately from the overhanging portion 43 may be fixed to the device body 12A. Also in this case, the same effect as in the exemplary embodiment described above is obtained.

Figure 12:
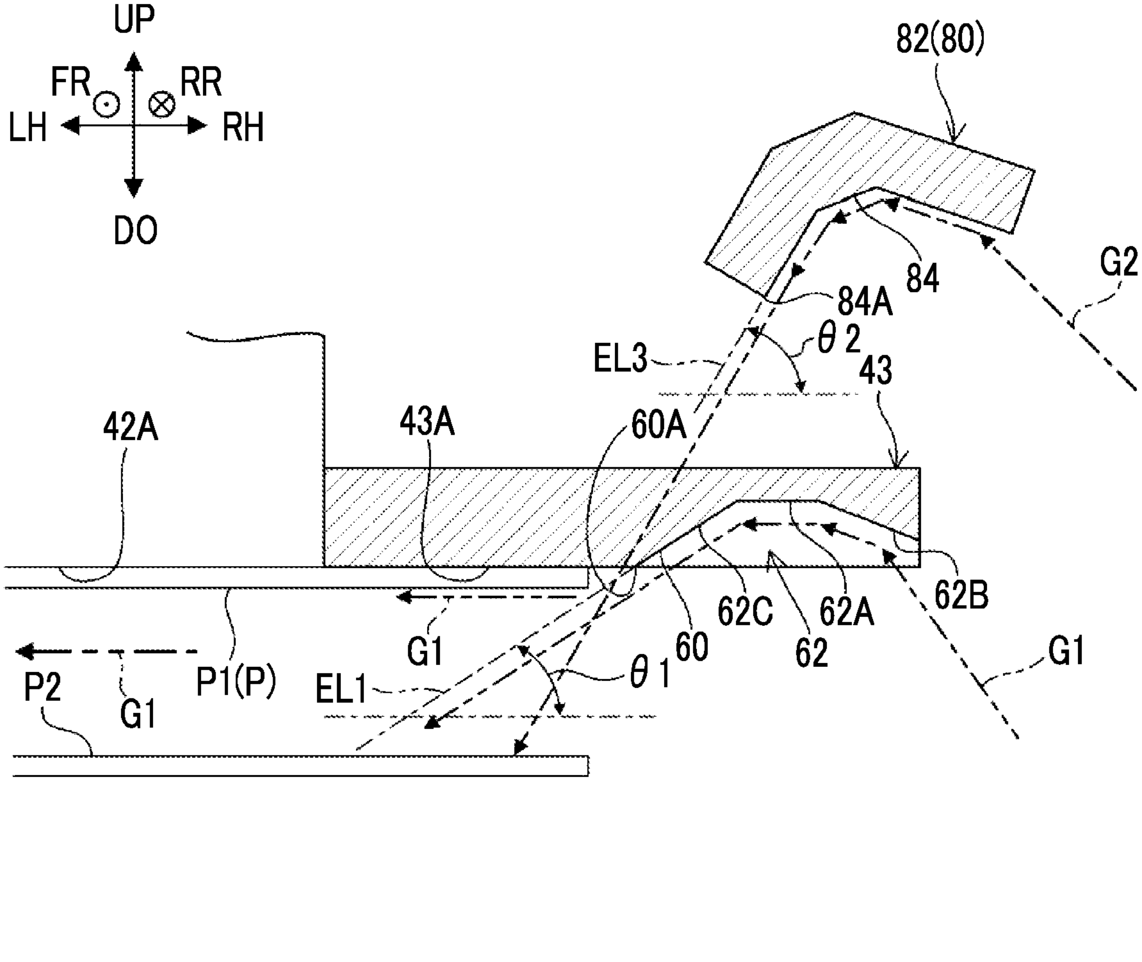
FIG. 12 is an enlarged view (corresponding to the enlarged view of FIG. 7) of a blasting unit of the feeding device according to the modification example.

Although the nozzle 76 of the blasting unit 70 faces the overhanging portion 43 side (obliquely downward to the left) and the air G2 is jetted from the tip opening of the nozzle 76 in the feeding device 12 of the exemplary embodiment described above, the present disclosure is not limited thereto. For example, as shown in FIG. 12, the air G2 jetted from a nozzle (not shown) of a blasting unit 80 may be blasted to the front surface side of the next medium P2 through a guide surface 84. Also in this case, a supply device (not shown) and a flow pipe (not shown) of the blasting unit 80 may be disposed below the feeding device 12 like the separating unit 50 or may be disposed at other places. Accordingly, a degree of freedom of layout inside the feeding device 12 improves. The reference sign 84A in FIG. 12 means an end of the guide surface 84 and is an example of the air blasting port. In addition, the reference sign EL3 means an extension line of the guide surface 84, and the air G2 flows toward the next medium P2 along an extension line EL3.

Although the pressure applied to the next medium P2 through air blasting of the blasting unit 70 is higher than the pressure applied to the next medium P2 through air supply of the separating unit 50 in the feeding device 12 of the exemplary embodiment described above, the present disclosure is not limited thereto. In a case where the blasting angle θ2 of the air G2 of the blasting unit 70 is larger than the supply angle θ1 of the air G1 of the separating unit 50, an effect of pulling the next medium P2 apart from the uppermost medium P1 is obtained.

The present disclosure is not limited to the exemplary embodiment, and various modifications, changes, and improvements can be made without departing from the gist thereof. For example, the plurality of modification examples described above may be configured in combination as appropriate.

(((1)))

A feeding device comprising:

a supply unit that supplies air between a plurality of stacked media and that floats the media;

a feeding unit that makes the media floated by the supply unit stick thereto and that feeds the media;

a separating unit that supplies the air obliquely downward to a front surface side of a second medium positioned immediately below a first medium stuck to the feeding unit from a downstream side to an upstream side in a medium feeding direction and that separates the second medium from the first medium; and a blasting unit that blasts the air obliquely downward to the front surface side of the second medium from the downstream side to the upstream side in the medium feeding direction and that has a blasting angle of the air with respect to the medium feeding direction larger than a supply angle of the air of the separating unit.

(((2)))

A feeding device comprising:

a supply unit that supplies air between a plurality of stacked media and that floats the media;

a feeding unit that makes the media floated by the supply unit stick thereto and that feeds the media;

a separating unit that supplies the air obliquely downward to a front surface side of a second medium positioned immediately below a first medium stuck to the feeding unit from a downstream side to an upstream side in a medium feeding direction and that separates the second medium from the first medium; and a blasting unit that is a separate body from the separating unit, that blasts the air obliquely downward to the front surface side of the second medium from the downstream side to the upstream side in the medium feeding direction, and that has a pressure applied to the second medium through air blasting higher than a pressure applied to the second medium through air supply by the separating unit.

(((3)))

The feeding device according to (((2))), wherein an air blasting region with respect to the second medium caused by the blasting unit is narrower than an air supply region with respect to the second medium caused by the separating unit.

(((4)))

The feeding device according to any one of (((1))) to (((3))), wherein the feeding unit delivers the medium to a feeding section through a movement in the medium feeding direction with respect to a device body, and the blasting unit is fixed to the device body.

(((5)))

The feeding device according to (((4))), wherein the feeding unit has a sticking surface to which the first medium is stuck, and an air supply port of the separating unit and an air blasting port of the blasting unit are positioned on a downstream side of the sticking surface in the medium feeding direction and on an inner side in a width direction of the medium in plan view.

(((6)))

The feeding device according to (((4))) or (((5))), wherein an air supply port of the separating unit and an air blasting port of the blasting unit are shifted away from each other in a direction orthogonal to the medium feeding direction in plan view.

(((7)))

The feeding device according to (((6))), wherein air supply ports are disposed at an interval in the orthogonal direction in plan view, and the air blasting port is disposed between the air supply ports adjacent to each other in the orthogonal direction.

(((8)))

The feeding device according to any one of (((1))) to (((5))), wherein the separating unit has an air supply unit disposed below the blasting unit, an air supply path that leads air supplied from the air supply unit upward, and a guide unit that guides the air supplied from the air supply path obliquely downward from the downstream side to the upstream side in the medium feeding direction.

(((9)))

The feeding device according to (((8))), wherein the guide unit and an air blasting port of the blasting unit are shifted away from each other in a direction orthogonal to the medium feeding direction in plan view.

(((10)))

The feeding device according to (((8))) or (((9))), wherein the feeding unit has a sticking surface to which the first medium is stuck and an overhanging portion that overhangs toward the downstream side in the medium feeding direction, the sticking surface of the feeding unit and a lower surface of the overhanging portion are connected to each other in the medium feeding direction, and the guide unit is provided at the lower surface of the overhanging portion.

(((11)))

The feeding device according to any one of (((1))) to (((10))), wherein the blasting unit blasts the air for a period from air supply start from at least the separating unit to the second medium to feeding start of the first medium by the feeding unit.

(((12)))

The feeding device according to (((11))), wherein the blasting unit continuously blasts the air until a feeding job of the plurality of media ends.

(((13)))

The feeding device according to (((12))), wherein an air blasting force of the blasting unit is smaller than a medium sticking force of the feeding unit.

(((14)))

The feeding device according to any one of (((1))) to (((10))), wherein the blasting unit blasts the air to the second medium after the air is started to be supplied from the separating unit to the second medium.

(((15)))

The feeding device according to (((14))), wherein the blasting unit stops blasting of the air to the second medium before feeding start of the first medium by the feeding unit.

(((16)))

The feeding device according to (((4))) or (((5))), wherein an air supply port of the separating unit and an air blasting port of the blasting unit are at the same position in a direction orthogonal to the medium feeding direction in plan view.

(((17)))

The feeding device according to (((16))), wherein air blasting by the blasting unit and air supply by the separating unit are alternately performed.

(((18)))

An image forming apparatus comprising:

the feeding device according to any one of (((1))) to (((17))); and an image forming unit that forms an image on a medium fed from the feeding device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A feeding device comprising:

a supply unit that supplies air between a plurality of stacked media and that floats the media;

a feeding unit that makes the media floated by the supply unit stick thereto and that feeds the media;

a separating unit that supplies the air obliquely downward to a front surface side of a second medium positioned immediately below a first medium stuck to the feeding unit from a downstream side to an upstream side in a medium feeding direction and that separates the second medium from the first medium; and a blasting unit that blasts the air obliquely downward to the front surface side of the second medium from the downstream side to the upstream side in the medium feeding direction and that has a blasting angle of the air with respect to the medium feeding direction larger than a supply angle of the air of the separating unit.

2. A feeding device comprising:

a supply unit that supplies air between a plurality of stacked media and that floats the media;

a feeding unit that makes the media floated by the supply unit stick thereto and that feeds the media;

a separating unit that supplies the air obliquely downward to a front surface side of a second medium positioned immediately below a first medium stuck to the feeding unit from a downstream side to an upstream side in a medium feeding direction and that separates the second medium from the first medium; and a blasting unit that is a separate body from the separating unit, that blasts the air obliquely downward to the front surface side of the second medium from the downstream side to the upstream side in the medium feeding direction, and that has a pressure applied to the second medium through air blasting higher than a pressure applied to the second medium through air supply by the separating unit.

3. The feeding device according to claim 2, wherein an air blasting region with respect to the second medium caused by the blasting unit is narrower than an air supply region with respect to the second medium caused by the separating unit.

4. The feeding device according to claim 1, wherein the feeding unit delivers the medium to a feeding section through a movement in the medium feeding direction with respect to a device body, and the blasting unit is fixed to the device body.

5. The feeding device according to claim 4, wherein the feeding unit has a sticking surface to which the first medium is stuck, and an air supply port of the separating unit and an air blasting port of the blasting unit are positioned on a downstream side of the sticking surface in the medium feeding direction and on an inner side in a width direction of the medium in plan view.

6. The feeding device according to claim 5, wherein an air supply port of the separating unit and an air blasting port of the blasting unit are shifted away from each other in a direction orthogonal to the medium feeding direction in plan view.

7. The feeding device according to claim 6, wherein air supply ports are disposed at an interval in the orthogonal direction in plan view, and the air blasting port is disposed between the air supply ports adjacent to each other in the orthogonal direction.

8. The feeding device according to claim 1, wherein the separating unit has an air supply unit disposed below the blasting unit, an air supply path that leads air supplied from the air supply unit upward, and a guide unit that guides the air supplied from the air supply path obliquely downward from the downstream side to the upstream side in the medium feeding direction.

9. The feeding device according to claim 8, wherein the guide unit and an air blasting port of the blasting unit are shifted away from each other in a direction orthogonal to the medium feeding direction in plan view.

10. The feeding device according to claim 9, wherein the feeding unit has a sticking surface to which the first medium is stuck and an overhanging portion that overhangs toward the downstream side in the medium feeding direction, the sticking surface of the feeding unit and a lower surface of the overhanging portion are connected to each other in the medium feeding direction, and the guide unit is provided at the lower surface of the overhanging portion.

11. The feeding device according to claim 1, wherein the blasting unit blasts the air for a period from air supply start from at least the separating unit to the second medium to feeding start of the first medium by the feeding unit.

12. The feeding device according to claim 11, wherein the blasting unit continuously blasts the air until a feeding job of the plurality of media ends.

13. The feeding device according to claim 12, wherein an air blasting force of the blasting unit is smaller than a medium sticking force of the feeding unit.

14. The feeding device according to claim 1, wherein the blasting unit blasts the air to the second medium after the air is started to be supplied from the separating unit to the second medium.

15. The feeding device according to claim 14, wherein the blasting unit stops blasting of the air to the second medium before feeding start of the first medium by the feeding unit.

16. An image forming apparatus comprising:
the feeding device according to claim 1; and
an image forming unit that forms an image on a medium fed from the feeding device.

17. An image forming apparatus comprising:
the feeding device according to claim 2; and
an image forming unit that forms an image on a medium fed from the feeding device.

18. An image forming apparatus comprising:
the feeding device according to claim 3; and
an image forming unit that forms an image on a medium fed from the feeding device.

* * * * *